US008073956B2

(12) United States Patent
Khanchandani et al.

(10) Patent No.: US 8,073,956 B2
(45) Date of Patent: Dec. 6, 2011

(54) MULTIMEDIA COMMUNICATIONS USING PREFERRED DEVICES

(75) Inventors: Niraj Khanchandani, Mercer Island, WA (US); Anton Krantz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1136 days.

(21) Appl. No.: 11/594,359

(22) Filed: Nov. 7, 2006

(65) Prior Publication Data

US 2008/0126549 A1    May 29, 2008

(51) Int. Cl.
*G06F 15/16* (2006.01)

(52) U.S. Cl. ........................................ 709/227; 370/352

(58) Field of Classification Search .................. 707/612, 707/614, 650; 709/213, 214, 215, 216, 248, 709/249; 726/2, 22, 26; 711/200, 215, 220; 380/1, 200, 243, 247, 251, 252
See application file for complete search history.

(56) References Cited

U.S. PATENT DOCUMENTS

| | | | |
|---|---|---|---|
| 6,681,252 B1 | 1/2004 | Schuster et al. | |
| 6,788,676 B2 | 9/2004 | Partanen et al. | |
| 7,164,762 B2 * | 1/2007 | Hanson et al. | 379/212.01 |
| 2003/0023730 A1 | 1/2003 | Wengrovitz et al. | |
| 2004/0139088 A1 | 7/2004 | Mandato et al. | |
| 2005/0063411 A1 | 3/2005 | Wang et al. | |
| 2005/0083912 A1 | 4/2005 | Afshar et al. | |
| 2005/0141694 A1 | 6/2005 | Wengrovitz | |
| 2005/0249196 A1 * | 11/2005 | Ansari et al. | 370/352 |
| 2006/0104306 A1 * | 5/2006 | Adamczyk et al. | 370/466 |

FOREIGN PATENT DOCUMENTS

| | | |
|---|---|---|
| WO | WO 2005/089063 A2 | 9/2005 |
| WO | WO 2006/006897 A1 | 1/2006 |
| WO | WO 2006/064347 A1 | 6/2006 |

OTHER PUBLICATIONS

"Session Initiation Protocol (SIP) Evolution in Converged Communications," Feb. 15, 2006, <http://www.intel.com/technology/itj/2006/volume10issue01/art02_SIP_evolution/p03_SIP.htm>.
Lazar, I., "Integrating Telephony, IM, Video and Mobility With Presence," Jun. 2006, <http://www.burtongroup.com/promo/downloads/pdf/Lazar0606.pdf>.
Schulzrinne, H., et al., "Internet Telephony: Architecture and Protocols: an IETF Perspective," Jul. 2, 1998, http://www.cs.columbia.edu/~hgs/papers/Schu9902_Internet.pdf>.

* cited by examiner

*Primary Examiner* — Vivek Srivastava
*Assistant Examiner* — Nega Woldemariam
(74) *Attorney, Agent, or Firm* — Merchant & Gould (57) ABSTRACT

Aspects of the present invention are directed at allowing users to establish a multimedia network session in which each user is allowed to employ multiple computing devices to exchange data. In this regard, a method is provided for collecting control information from at least two local computing devices associated with the first user that will participate in the network session. Then, an invitation message with the collected control information is sent to a computing device associated with a second user. In response, control information collected from one or more computing devices associated with the second user are obtained. The obtained control information is distributed to the appropriate local computing devices associated with the first user. As a result of exchanging control information in this way, a multimedia network session that allows users to employ a plurality of computing devices may be established.

19 Claims, 5 Drawing Sheets

MULTIMEDIA COMMUNICATIONS USING PREFERRED DEVICES

BACKGROUND

Modern networks have revolutionized the way in which people obtain information. In this regard, IP data networks developed for the Internet provide an opportunity for users to interact utilizing multimedia communications. For example, a computing device with the appropriate hardware and software allows a user to send/receive video, audio, instant messages (e.g., text), and the like between other networked computing devices. Data transmitted over the IP data network is processed into a sequence of data blocks, called packets, that adhere to IP protocols capable of communicating a variety of media types. With a personal computer, such as a desktop or laptop, users may establish multimedia network sessions in which different media types are communicated concurrently.

Increasingly, media-specific computing devices are being developed that are configured to transmit data over IP data networks. For example, an IP phone implements functionality to digitize analog phone signals, partition the digitized signal into packets, and transmit the packets to another IP networked computing device. In this example, the audio data may be packetized in accordance with the Voice over Internet Protocol ("VOIP"). With the development of these types of devices, users may communicate audio data over a network without necessarily using a personal computer. In other words, instead of a user being required to use an audio input device (e.g., microphone) that is connected to a personal computer, a network accessible IP phone may be employed to communicate audio data directly over an IP data network.

A deficiency with existing systems is that different real-time media types may only be communicated during a multimedia network session using the same computing device. In this regard, a user may employ a personal computer with the appropriate hardware and software to participate in an online conference in which real-time video, audio, instant messages (e.g., text), and the like are communicated between computing devices. However, the user may not employ a plurality of networked computing devices to transmit these different media types. For example, a user may prefer to use a Web cam associated with a personal computer to transmit video data during the online conference, while concurrently using an IP phone to communicate audio data. With existing systems, a user can only communicate multiple real-time media types from the same computing device. This deficiency limits the use of computing devices, such as IP phones, that provide features desired by users.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Aspects of the present invention are directed at the establishment of a multimedia network session in which each user is able to employ multiple computing devices to exchange data. In accordance with one embodiment, a method is provided for exchanging control information to establish the multimedia network session. In this regard, the method includes collecting control information from at least two local computing devices associated with the first user that will participate in the multimedia network session. Then, an invitation message with the collected control information is sent to a computing device associated with a second user. In response, control information is collected from computing devices associated with the second user. The obtained control information is distributed to the appropriate local computing devices associated with the first user. As a result of exchanging control information in this way, direct communication channels may be established from multiple devices associated from the same user.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Prior to discussing the details of the invention, it should be understood that the following description is presented largely in terms of logic and operations that may be performed by conventional computer components. These computer components, which may be grouped in a single location or distributed over a wide area, generally include computer processors, memory storage devices, display devices, input devices, etc. In circumstances where the computer components are distributed, the computer components are accessible to each other via communication links.

In the following description, numerous specific details are set forth in order to provide a thorough understanding of the invention. It will be apparent, to one skilled in the art, however, that the invention may be practiced without some or all of these specific details. In other instances, well-known process steps have not been described in detail in order not to unnecessarily obscure the invention.

Figure 1A:
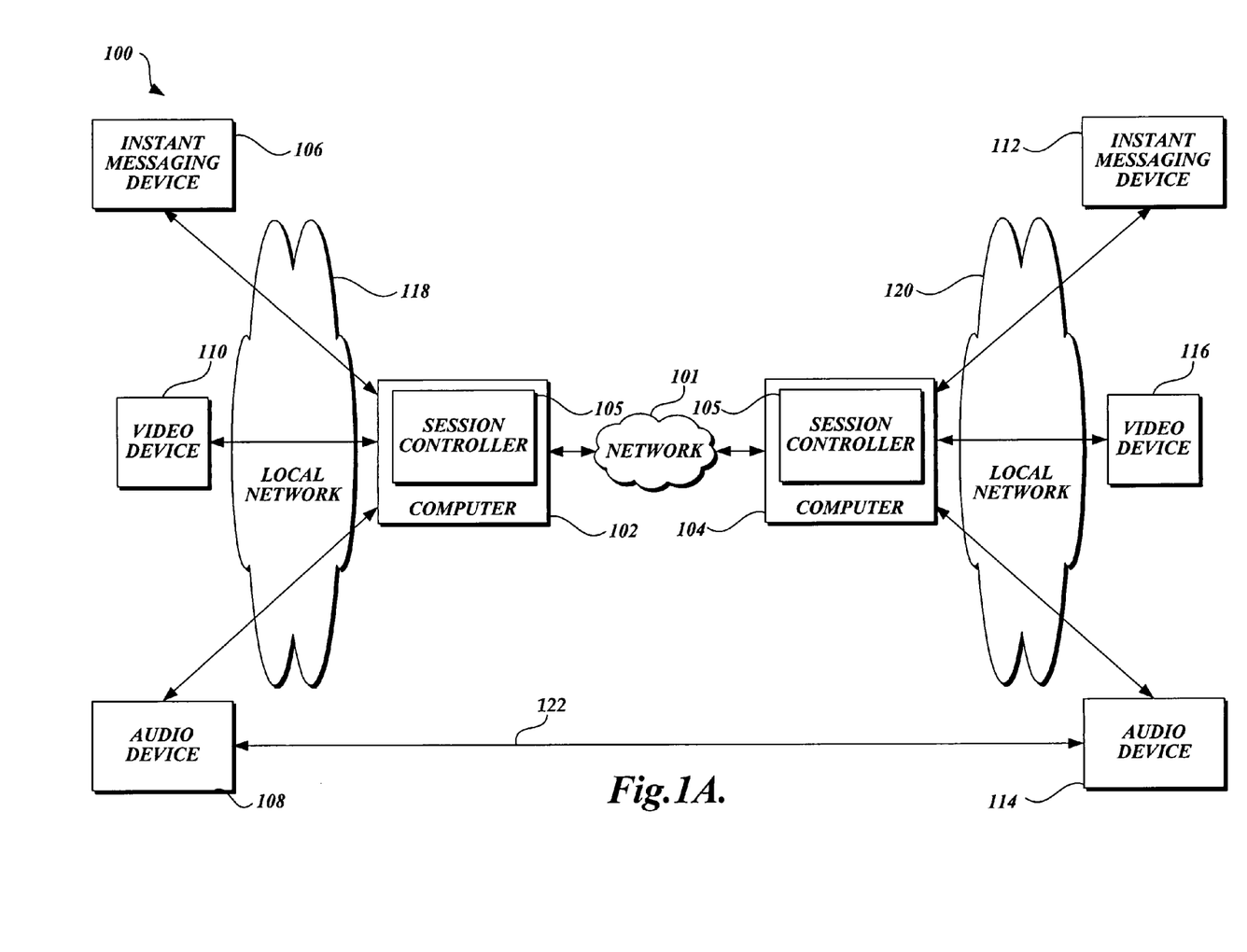
FIGS. 1A-1B illustrate a network environment in which aspects of the present invention may be implemented.

FIG. 1A and the following discussion is intended to provide a brief, general description of a networking environment 100 in which aspects of the present invention may be implemented. As illustrated in FIG. 1A, the networking environment 100 is comprised of the computers 102-104 communicatively connected via the network 101. In this example, the computers 102-104 include a software system that operates as a session controller 105 to manage the exchange control information between networked computing devices. By way of example only, the computers 102-104 may be desktop computers, laptop computers, mini- and mainframe computers, server computers, hand-held computing devices such as personal digital assistants and tablets, microprocessor-based and/or programmable consumer electronics including media systems, set-top boxes, gaming systems, or any other computing device capable of serving as a session controller. Those skilled in the art and others will recognize that the network 101 may be implemented as a local area network ("LAN"), wide area network ("WAN"), cellular network, IEEE 802.11, Bluetooth wireless networks, and the like. Typically, the network 101 will be the global network commonly known as the Internet or World Wide Web ("WWW"). However, those skilled in the art will recognize that the invention may also be used in other interactive environments, such as local or wide area networks or any other data networks that communicate using IP protocols.

As further illustrated in FIG. 1A, the computer 102 is associated with the instant messaging device 106 (e.g., a personal digital assistant, tablet, etc.), the audio device 108 (e.g., an IP phone), and the video device 110 (e.g., an HDTV, media system, set-top box, game console, or any other computing device configured to transmit/receive video similar to a Web camera). Similarly, the computer 104 is associated with the instant messaging device 112 (e.g., a personal digital assistant, tablet, etc.), the audio device 114 (e.g., an IP phone), and the video device 116 (e.g., an HDTV, media system, set-top box, game console, etc.). In the illustrative embodiment depicted in FIG. 1A, the devices 106-110 associated with the computer 102 maintain a network connection to the local network 118. Similarly, the devices 112-116 associated with the computer 104, maintain a network connection to the local network 120. Through the local network 118, data may be transmitted locally from the devices 106-110 to the computer 102. Also, those skilled in the art in others will recognize that the network connections on the local network 118 may be used to transmit data directly over the network 101. Similarly, computing devices connected to the local network 120 may transmit data over the network 101 to non-local computing devices. It should also be noted that, while the present invention is generally described in terms of operating in conjunction with specific types of computing devices and networks, this is for illustration purposes only and should not be construed as limiting. Instead, those skilled in the art will readily recognize that any number of different devices and network configuration may be used in conjunction with the present invention.

To establish a multimedia network session, control information is exchanged between computing devices that will participate in the network session. In this regard, the Session Initiation Protocol ("SIP") is an exemplary protocol for initiating, modifying, and terminating a network session that involves multimedia streams such as video, audio, instant messaging, etc. However, those skilled in the art and others will recognize that other protocols may be used to exchange control information. In this regard and by way of example only, control information may be exchanged between a session controller and local computing devices utilizing SIP or the Media Gateway Control Protocol (MGCP), Megaco/H.248, Network Control Program (NCP), Simple Object Access Protocol (SOAP), and the like. Moreover, control information may be exchanged across session controllers utilizing SIP or similar protocol such as, but not limited to, the Extensible Messaging and Presence Protocol ("XMPP"), H.323, and the like.

When SIP is selected for the control protocol, session description information and messages will be exchanged over a SIP signaling channel and the various media streams may be exchanged using any type of media channel that is capable of supporting real-time communications such as the Real-Time Transport Protocol ("RTP"). For the purpose of discussion, a channel, as used herein, generally refers to any type of data or signal exchange mechanism. Moreover, when SIP is selected for the control protocol, information describing the attributes of the various media streams may be exchanged using the Session Description Protocol ("SDP").

Traditionally, multiple computing devices could not be employed by the same user during the same network session. Instead, only those I/O devices directly connected to a computing device that acted as a session controller were available to send/receive multimedia communications. Rather than a user being able to transmit audio data using an IP phone, for example, and video and instant messages with a desktop computer, the user was required to use those I/O devices directly connected to one computing device.

Generally described, aspects of the present invention allow a user to employ a plurality of computing devices to send/receive different media types in a multimedia network session. To this end, direct communication channels may be established between computing devices that are preferred for communicating a particular media type. Instead of each media stream being routed through a computing device that manages the exchange of control information, one or more media streams may be communicated directly between preferred computing devices. As illustrated in FIG. 1A and by way of example only, the audio devices 108 and 114 can directly communicate during a multimedia network session over the direct communication channel 122 without the audio stream(s) being routed through computing devices that manage the exchange of control information (e.g., the computers 102-104). Similarly, instant messaging and video data may be communicated over direct communication channels (not illustrated) between the instant messaging devices 106 and 112 and the video devices 110 and 116, respectively. While FIG. 1A illustrates a system configuration where the computers 102-104 that manage the exchange of control information do not also participate in transmitting media streams, this is merely exemplary. FIG. 1A illustrates the connections between computing devices for exchanging control information. Once direct communication channels have been established, media streams may be directly communicated without using a session controller.

Figure 1B:
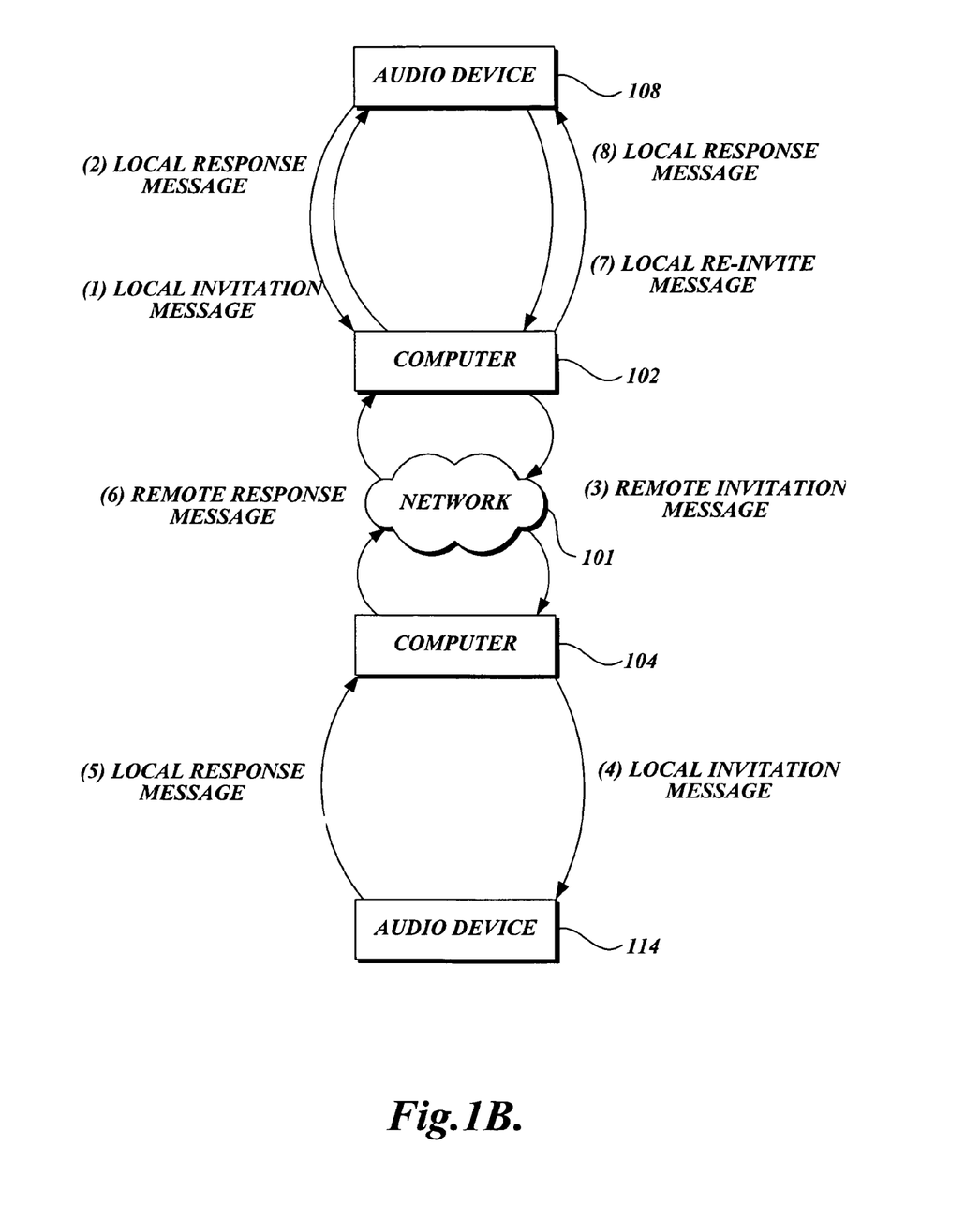

With reference now to FIG. 1B, an exemplary exchange of control information in the networking environment 100 that enables a user to employ a plurality of computing devices during a multimedia network session will be described. While FIG. 1B only depicts the computers 102-104 and the audio devices 108 and 114, this is for illustrative purposes only. Traditionally, to establish a multimedia network session, one set of invitation/response messages is sufficient to exchange the necessary control information. Since users were only able to participate in the multimedia network session using one networked computing device, multiple sets of invitation/response messages were not necessary. In accordance with one embodiment, the present invention enhances the process of exchanging control information so that a user may employ more than one computing device to participate in a multimedia network session.

As illustrated in FIG. 1B, the computer 102 transmits a local invitation message to the audio device 108. The invitation message may be transmitted in response to a first user (associated with computer 102) generating a request to initiate a multimedia network session with a second user (associated with computer 104). The local invitation message is processed on the audio device 108 and a local response is transmitted back to the computer 102. In accordance with one embodiment, the response includes control information sufficient to establish a communication channel with the audio device 108. As described in further detail below, a networked computing device that receives this control information may establish a direct communication channel with the audio device 108. Once the computer 102 obtains control information from all of the local computing devices, processing is performed on the computer 102 to multiplex the control information. Then, a single remote invitation message to participate in a multimedia session is transmitted from the computer 102 to the computer 104 over the network 101.

When the computer 104 receives the remote invitation message, processing is performed to de-multiplex the received control information. In this example, when the control information is de-multiplexed, a local invitation message with control information sufficient to establish a direct communication channel with the audio device 108 is transmitted to the audio device 114. The local invitation message is processed, and the audio device 114 transmits a local response back to the computer 104. Similar to the description provided above, this response includes control information sufficient to establish a direct communication channel with the audio device 114. Once the computer 104 collects all of the control information corresponding to the multimedia network session from the local computing devices, the control information is multiplexed. Then, the computer 104 transmits a remote response with all of the collected control information back to the computer 102.

As further illustrated in FIG. 1B, control information received from the computer 104 is processed on the computer 102 and a local re-invite message is transmitted to the audio device 108. In this example, the local re-invite message includes control information that may be used to establish an audio channel with the audio device 114. The audio device 108 processes the re-invite message and transmits a local response back to the computer 102. As a result of exchanging control information in this way, the audio devices 108 and 114 are now able to establish the direct communication channel 122 (FIG. 1) to exchange audio data. As a result, audio data exchanged during a multimedia network session does not have to be routed through the computers 102-104.

Now with reference to FIGS. 2A-2B, a set-up routine 200 that enables users to employ multiple networked computing devices during a multimedia network session will be described. Those skilled in the art and others will recognize that a variety of protocols may be selected to exchange control information. As mentioned previously with reference to FIG. 1A, while aspects of the present invention may be described as exchanging control information between both local computing devices and session controllers utilizing SIP, this should be construed as exemplary.

Figure 2A:
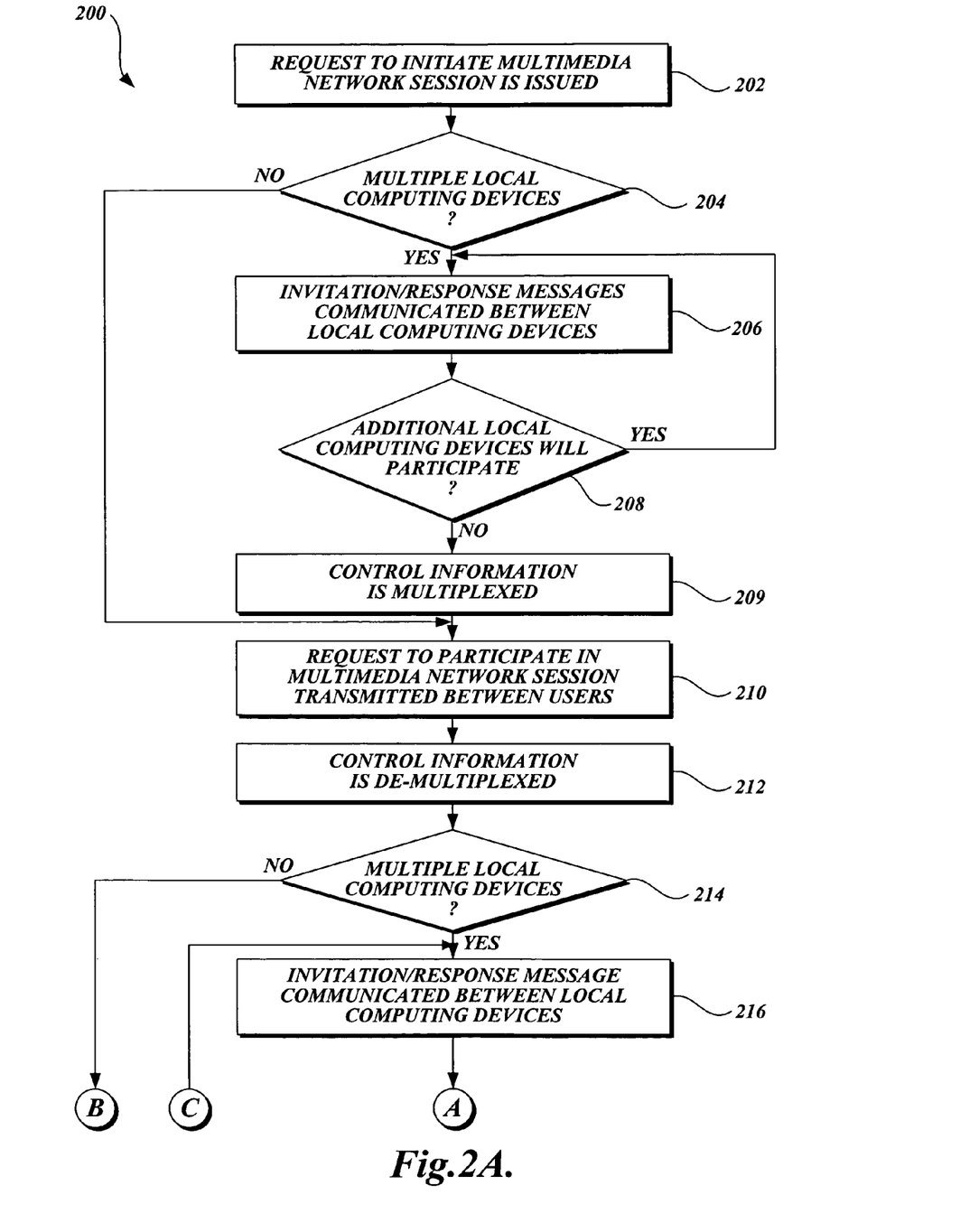
FIGS. 2A-2B illustrate an exemplary flow diagram for establishing a multimedia network session in which a user may employ multiple computing devices in accordance with the one embodiment of the present invention.

As illustrated in FIG. 2A, the set-up routine 200 begins at block 202 where a first user issues a request to initiate a multimedia network session with a second user. While this example describes a set-up routine 200 for establishing a multimedia network session between two users, embodiments of the present invention may be used with any number and combination of users. In order to issue the request, at block 202, a user may activate a control accessible from an application program. By way of another example, the user may interact with hardware-based controls such as numbers on a dial pad available from an IP phone to initiate the multimedia network session.

At decision block 204, a determination is made regarding whether the user initiating the multimedia network session will employ multiple networked computing devices. In accordance with one embodiment, system settings identify a user's preferred devices for communicating in a multimedia network session. For example, a user may employ a system configuration where a desktop computer is closely associated with an IP phone. The user's preferences may dictate that audio data be sent/received using the IP phone while video and instant messages are sent/received using the desktop computer. In these instances when system settings dictate that multiple computing devices will be used to communicate during the multimedia network session, the set-up routine 200 proceeds to block 204. Conversely, if multiple networked computing devices will not be used, the set-up routine 200 proceeds to block 210, described in further detail below.

At block 206, invitation/response messages are exchanged between the local computing device that serves as a session controller and a computing device that is allocated at least one media channel. If block 206 is reached, user preferences dictate that multiple local computing devices will participate in the network session. In accordance with one embodiment, one local computing device serves as a session controller by managing the exchange of control information. For example, in the networking environment 100 described above with reference to FIGS. 1A-1B, the computer 102 executes the session controller 105 to manage the collection and exchange of local control information on behalf of the computing devices 106-110. In this example, the computing device that serves as a session controller (e.g., the computer 102) exchanges invite/response messages with a computing device that is allocated at least one media channel (e.g., the audio device 106), at block 206. In one embodiment, at least one communication channel is allocated in response to the invitation message being received. When the communication channel is allocated, a port address for connecting to the open port is generated. Then a response that includes the port address that identifies the allocated communication channel is transmitted in response to the local computing device that is serving as a session controller.

At decision block 208, a determination is made regarding whether additional local computing devices will participate in the multimedia network session. If the result of the test is "yes," the set-up routine 200 proceeds back to block 206, and blocks 206-208, repeat until control information has been collected from all the appropriate local computing devices. In this instance, multiple invitation/response messages may be transmitted from the computing device that serves as the local session controller. For example, in the context of FIG. 1A, the computer 102 may successively poll each of the computing devices 106-110 so that the appropriate communication channels may be allocated and the corresponding control information collected. Conversely, if the result of the test performed at block 208 is "no," the set-up routine 200 proceeds to block 209.

As illustrated in FIG. 2A, at block 209, control information received from a plurality of local computing devices is multiplexed for inclusion in a single data structure. As mentioned previously and in accordance with one embodiment, control information that corresponds to a multimedia network session may be communicated between remote computing devices in accordance with the SIP and SDP protocols. In this embodiment, once all the local control information has been collected, processing is performed on the local computing device that serves as the local session controller. The processing multiplexes or combine control information for all of the communication channels that will be established. To this end, the computing device that serves as the local session controller may combine various m-lines and c-lines in response messages received from other local computing devices. As a result, all of the session description information needed to conduct the multimedia network session across all of a user's preferred computing devices is available from a single data structure.

At block 210, a computing device associated with the first user transmits a request to initiate a multimedia network session to a computing device associated with the second user. For example, in the description provided above with reference to FIGS. 1A-1B, the computer 102 may transmit an invitation message to the computer 104, at block 210. While the invitation to participate in a multimedia network media session is described herein as being transmitted between computing devices that serve as a session controllers, this should be construed as exemplary. In other embodiments, an invitation message may be transmitted between other computing devices. In any event, the transmitted invitation message includes all of the control information needed to conduct a multimedia network session across the first user's preferred computing devices.

In response to receiving the invitation message, the second user may accept the invitation to establish the multimedia network session or execute other appropriate actions. In the illustrative embodiment illustrated in FIG. 2A, the second user accepts the invitation to participate in the multimedia network session. Then processing is performed on the computer 104 to de-multiplex the received control information, at block 212. In the embodiment in which control information is transmitted in accordance with the SIP and SDP protocols, de-multiplexing the received control information, may include separating m-lines and c-lines from a single data structure. However, in other embodiments, de-multiplexing the received control information may include performing other types of processing without departing from the scope of the claimed subject matter.

Once the control information has been de-multiplexed, incompatibilities between the users' computer systems may become apparent. For example, the invitation to participate in the multimedia network session may request the establishment of a video, audio, and instant messaging communication channels. However, the computer system that receives the invitation message may not be configured with the necessary hardware/software resources to establish all of the requested communication channels. In this example, only those communication channels that are capable of being established, given the attributes of the users' computer systems are actually established. Since incompatibilities between users' computer systems may be handled by existing systems, further description of these systems will not be described in further detail here.

At decision block 214, a determination is made regarding whether the user that received the invitation request will employ multiple computing devices to participate in the multimedia network session. As mentioned previously, system settings may identify a user's preferred devices in participating in a multimedia network session. If the system settings indicate that multiple computing devices will be used, the set-up routine 200 proceeds to block 216. Conversely, if multiple networked devices will not be used, the set-up routine 200 proceeds to block 223, described in further detail below.

At block 216, invitation/response messages are exchanged between a computing device that serves as the local session controller and a computing device that is allocated at least one communication channel. If block 216 is reached, preferences indicate that the user who received the invitation will employ multiple computing devices to participate in the multimedia network session. In the exemplary embodiment depicted in FIGS. 1A-1B, the computer 104 exchanges invite/response messages with a computing device that is allocated at least one communication channel, such as the audio device 114. By way of example only, the audio device 114 may allocate an audio channel and transmit the port address of the audio channel back to the computer 104 in a response.

At decision block 218, a determination is made regarding whether additional local computing devices will participate in the multimedia network session. If the result of the test is "yes," the set-up routine 200 proceeds back to block 216, and blocks 216-218, repeat until control information has been collected from all the local computing devices that will participate in the multimedia network session. Similar to the description provided above with reference to block 206, the computer 104 may successively exchange a set of invitation/response messages with each of the computing devices 112-116. The invitation messages distribute control information received from the first user and cause all of the appropriate media channels to be opened on the local computing devices. The responses effectively aggregate all of the local control information at a central location for transmission back to the first user. Conversely, if the result of the test performed at block 218 is "no," the set-up routine 200 proceeds to block 220.

Figure 2B:
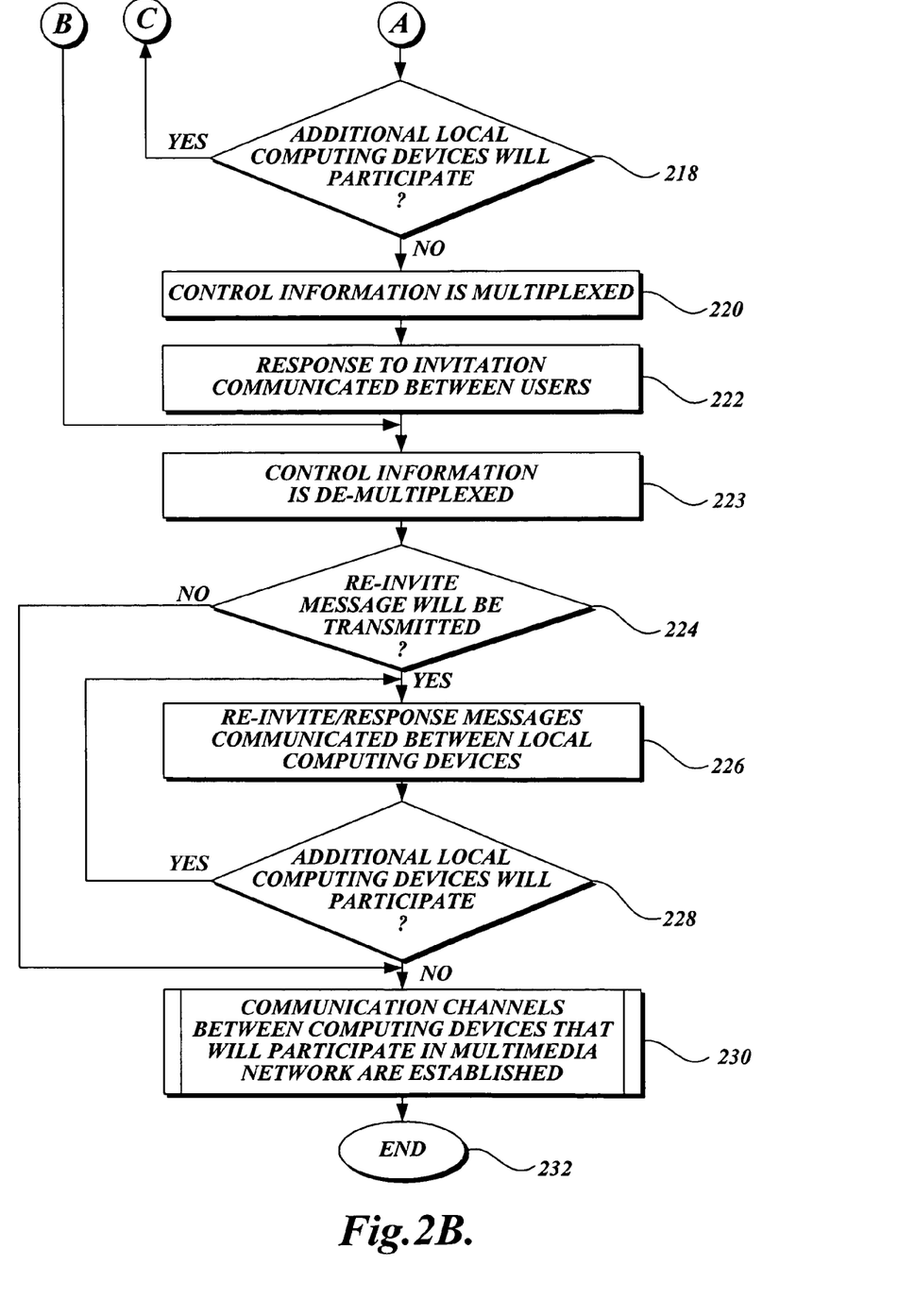

As illustrated in FIG. 2B, at block 220, control information received from a plurality of local computing devices is multiplexed so that this data may be included in one response message. Similar to the description provided above, once all the local control information has been collected, processing is performed to multiplex the information into a single data structure by combining various m-lines and c-lines from the received response messages. As a result, all of the control information needed to conduct a multimedia network session with the second user may be transmitted to the first user in a single response message.

At block 222, the computer 104 transmits a response corresponding to the invitation to participate in a multimedia network session back to the computer 102. The response includes all of the control information needed to conduct a multimedia network session with the second user. Then, processing is performed on the computer 102 to de-multiplex the received control information, at block 223. Similar to the description provided above, de-multiplexing the received control information may include separating m-lines and c-lines from a single data structure.

At decision block 224, a determination is made regarding whether a re-invite message will be transmitted to at least one local computing device. As mentioned previously, a re-invite message includes control information for establishing a direct communication channel with a computing device associated with another user. If a determination is made at block 224 that a re-invite message is not necessary, the set-up routine proceeds to block 230. This may occur, for example, if the user who is initiating the multimedia network session is only using a single computing device. Conversely, if a re-invite message will not be transmitted, the set-up routine 200 proceeds to block 226.

At block 226, a set of re-invite/response messages are exchanged between a computing device that serves as the local session controller and a computing device that is allocated at least one communication channel. Then, at block 228, a determination is made regarding whether additional local computing devices will participate in the multimedia network session. If the result of the test is "yes," the set-up routine 200 proceeds back to block 226, and blocks 226-228, repeat until control information for establishing a multimedia network session with the second user has been distributed to all of the appropriate local computing devices. In the example provided above with reference to FIGS. 1A-B, the computer 102 may successively exchange re-invite/response messages with each of the computing devices 106-110 until all of the control information that originated from the devices 112-116 has been distributed.

At block 230, communication channels between the appropriate computing devices that will participate in the multimedia network session are established. If block 230 is reached, all of the control information related to the multimedia network session has been successfully exchanged between the appropriate computing devices. When the communication channels are established, the computing devices that are participating in the multimedia network session start communicating with each other by exchanging data packets. Then the set-up routine 200 proceeds to block 232, where it terminates.

Figure 3:
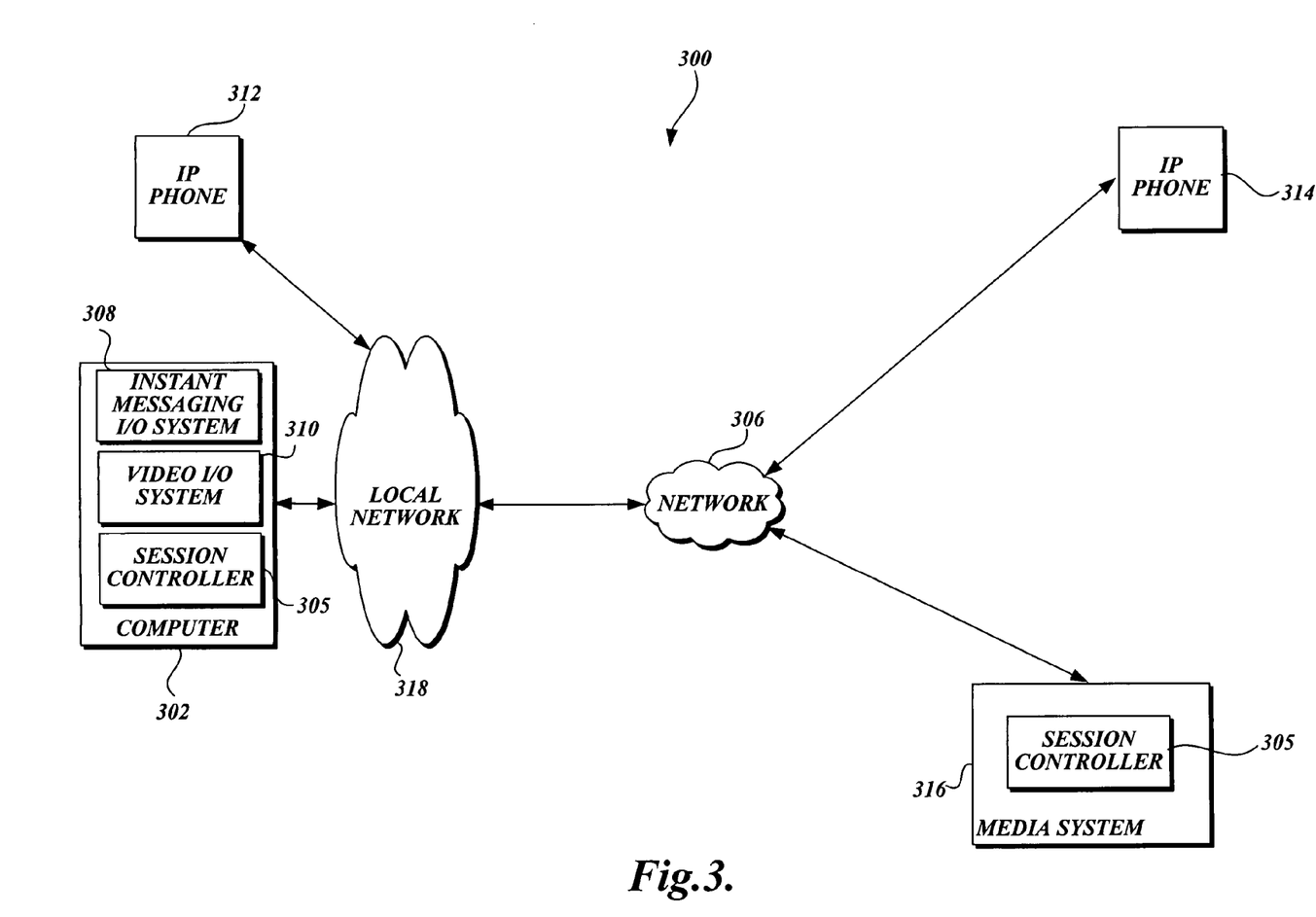
FIG. 3 illustrates another network environment suitable for implementing aspects of the present invention.

Now with reference to FIG. 3, another exemplary networking environment 300 in which aspects of the present invention may be implemented will be described. As illustrated in FIG. 3, the networking environment 300 includes the computer 302 that is communicatively connected to both the network 306 and the local network 318. In this example, the computer 302 includes the session controller 305, an instant messaging I/O system 308, and a video I/O system 310. Collectively, the instant messaging I/O system 308 and the video I/O system 310 are configured to input and/or output instant messages and video data from the computer 302, respectively. In this regard, the I/O systems 308-310 may include suitable software and hardware components for transmitting video and instant messages such as a video camera, a display screen, a keyboard, and the like. Moreover, the computer 302 is associated with an IP phone 312 capable of sending/receiving audio data over the network 306. The system configuration associated with the computer 302 is one where the computer 302 is a closely associated with the IP phone 312. In this instance, the user's preferences may dictate that the IP phone 312 be used to send/receive audio data, while the computer 302 and associated components are used to communicate video data and/or instant messages.

As further depicted in FIG. 3, the networking environment 300 includes the IP phone 312 and media system 316 that are directly connected to the network 306. This system configuration is one where a user's preferences dictate that the IP phone 314 communicates audio data, while the media system 316 communicates video data. In this example, the media system 316 includes the session controller 305 for exchanging control information with the computer 305.

The variations on the system configuration depicted in FIG. 3 illustrate that aspects of the present invention may be applied in numerous contexts. In this example, users may cause a direct video channel connection to be established between the computer 302 and the media system 316. Similarly, an audio channel connection may be established between the IP phones 312-314. Since, a user associated with the media system 316 and IP phone 314 does not have the resources needed to communicate instant messages, the multimedia network session is established, in this example, without an instant messaging communication channel.

While illustrative embodiments have been illustrated and described, it will be appreciated that various changes can be made therein without departing from the spirit and scope of the invention.

The embodiments of the invention in which an exclusive property or privilege is claimed are defined as follows:

1. In a networking environment configured to exchange different media types, a method of establishing a multimedia network session in which a first user may employ multiple computing devices to transmit data, the method comprising:
   polling a plurality of local computing device associated with the first user to determine local computing devices associated with the first user that will participate in the network session;
   collecting control information from at least two local computing devices associated with the first user that will participate in the network session;
   sending an invitation message that includes the collected control information to a computing device associated with a second user;
   receiving a response to the invitation message that includes control information collected from the second user;
   wherein sending an invitation message to a computing device associated with a second user includes multiplexing the control information into a single data structure by combining media lines and connection lines, and wherein receiving a response to the invitation message includes de-multiplexing the control information from the data structure; and
   sending a re-invite message based on the received control information to at least two local computing devices associated with the first user that will participate in the multimedia network session.

2. The method as recited in claim 1, further comprising using the received control information to establish separate communication channels in which different media types are communicated from each of the two local computing devices.

3. The method as recited in claim 2, wherein the different media types that may be transmitted over the separate communication channels include audio, video, and instant messages.

4. The method as recited in claim 1, wherein the control information is exchanged in accordance with the Session Initiation Protocol, and wherein attributes of a media stream are exchanged in accordance with the Session Description Protocol.

5. The method as recited in claim 1, wherein the two local computing devices associated with the first user that will participate in the network session are a computer and an IP phone.

6. The method as recited in claim 1, wherein collecting the control information includes establishing system settings that identify the first users preferred computing devices for communicating during the multimedia network session.

7. The method as recited in claim 1, wherein the control information is collected in response to a user-generated request to initiate the multimedia network session.

8. The method as recited in claim 1, wherein collecting the control information includes:
   transmitting an invitation message to a local computing device;
   causing a communication port on the local computing device to be opened; and
   transmitting a response message that includes an address for the open communication port from the local computing device that received the invitation message.

9. The method as recited in claim 1, wherein distributing the received control information to at least two local computing devices includes identifying a local computing device that will establish a direct communication channel with a computing device associated with the second user.

10. A non-transitory computer-readable medium containing computer-readable instructions which, when executed in a networking environment, performs a method of establishing a multimedia network session in which a first user and a second user may each communicate using multiple computing devices, the method comprising;
    sending an invitation message to participate in the multimedia network session wherein sending an invitation message to a computing device associated with a second user includes multiplexing control information into a single data structure by combining media lines and connection lines, and wherein receiving a response to the invitation message includes de-multiplexing the control information from the data structure;
    wherein the invitation message includes control information for establishing a communication channel with a computing device associated with the first user that does not manage the exchange of control information; and in response to the invitation message being received at a computing device associated with the second user, sending a re-invite message based on the using the control information to establish a direct communication channel between the computing device associated with the first user that does not manage the exchange of control information and a computing device associated with the second user.

11. The non-transitory computer readable-medium as recited in claim 10, wherein the media is transmitted over the communication channel without the media being routed through a computing device that manages the exchange of session control information.

12. The non-transitory computer readable-medium as recited in claim 10, wherein the communication channel established between the computing devices was identified as being preferred for communicating a particular media type.

13. The non-transitory computer readable-medium as recited in claim 10, wherein sending an invitation message to participate in the multimedia network session includes collecting a set of control information from the local computing devices that will participate in the multimedia network session.

14. The non-transitory computer-readable medium as recited in claim 10, wherein sending an invitation message to participate in the multimedia network session includes determining whether the user that is initiating the multimedia network session will employ multiple networked computing devices.

15. The non-transitory computer readable-medium as recited in claim 10, wherein establishing a direct communication channel includes:

collecting control information from the local computing devices associated with the second user; and sending a response to the invitation message that includes the control information collected from the local computing devices associated with the second user.

16. The non-transitory computer readable-medium as recited in claim 15, further comprising distributing the received control information collected from the local computing devices associated with the second user to at least two local computing devices associated with the first user.

17. A computer system for exchanging control information that corresponds to a multimedia network session in which separate communication channels may be established on multiple computing devices associated with the same user, the computer system comprising:

a first session controller computing device operative to:
    collect a set of local control information;
    exchange one or more sets of control information with the second session controller computing device;
    exchange a particular media stream on a first communication channel;

a first media specific computing device associated with the first session controller computing device that exchanges a media stream on a second communication channel upon receipt of a re-invite message based on the control information;

a second session controller computing device operative to:
    collect a set of local control information;
    exchange one or more sets of control information with the first session controller computing device;
    exchange a particular media stream on either the first communication channel or the second communication channel; and a second media specific computing device associated with the second session controller computing device that exchanges a media stream on either the first or second communication channel.

18. The computer system as recited in claim 8, wherein the first and second communication channels may be configured to transmit an audio stream, video stream, or instant messages.

19. The computer system as recited in claim 8, wherein the first session controller computing device is a desktop computer and the first specific computing device is an IP phone.

* * * * *